Patented Apr. 15, 1952

2,592,931

UNITED STATES PATENT OFFICE 2,592,931

THIOTHIAZOLONE DERIVATIVES

Taizo Matsukawa, Suitashi, Osaka, and Takeo Iwatsu, Higashisumiyoshi-ku, Osaka, Japan, assignors to Takeda Yakuhin Kogyo Kabushikigaisha, Higashi-ku, Osaka-shi, Japan No Drawing. Application August 29, 1950, Serial No. 182,142

5 Claims. (Cl. 260—256.5)

This invention relates to thiothiazolone-derivatives of the general formula

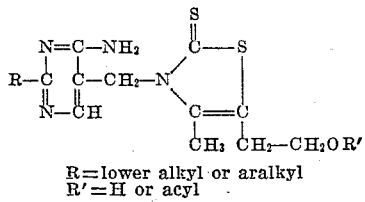

R=lower alkyl or aralkyl
R'=H or acyl

The compounds with such skeleton are hitherto quite unknown, regardless of what R and R' may be.

They are produced when 2-alkyl-4-amino-5-aminomethylpyrimidine is condensed with γ-aceto-γ-chloropropylalcohol and carbon disulphide in the presence of a basic, acid-neutralizing agent and then the intermediate is cyclized with a mineral acid (in accordance with the disclosure in the applicants' copending application, Ser. No. 182,141, filed on even date herewith), or as one of the products which form when the compounds of general formula

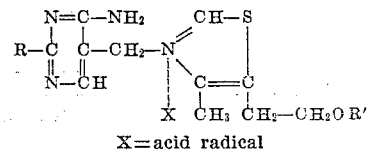

X=acid radical are oxidized with air in an alkaline medium (J. Pharm. Soc. Japan, 70, 28–34 (1950)).

Of these compounds the one (R=CH₃, R'=H) crystallizes from alcohol in colourless needles, melting at 238–239°, insoluble in water, soluble in alcohol and methanol, and also in mineral acids forming salts. The decomposition point of the hydrochloride of this compound is 243° and that of the picrate, 185°. The compound (R=C₂H₅, R'=H) crystallizes from alcohol in colourless prisms, melting at 233°, and the compound (R=C₆H₅CH₂, R'=H)

from dilute alcohol in colourless plates, melting at 224°.

The structure of these compounds is established in the following manner: Namely, when alcoholic solutions of these compounds are treated with mercury carbonate in order to desulfurize, corresponding thiachromine derivatives are formed, which are in accordance with authentic samples (J. Pharm. Soc. Japan, 69, 119 (1949)).

The reaction is represented by the following equation:

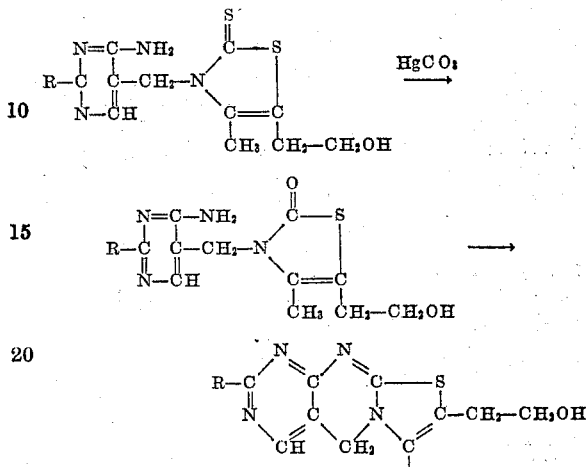

The analysis of the compound, M. P. 238–239° (R=CH₃, R'=H) gives C, 48.98; H, 5.91; S, 21.59; N, 18.84 (calcd. for $C_{12}H_{16}ON_4S_2$, C, 48.65; H, 5.41; S, 21.62; N, 18.9), and that of the hydrochloride, C, 43.07; H, 5.52 (calcd. for $C_{12}H_{16}ON_4S_2HCl$

C, 43.31; H, 5.11).

This result, with the data of the above experiment for the determination of structure, establishes that the said compounds are those of general formula

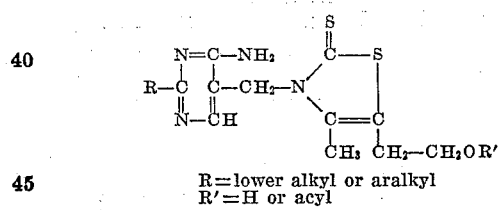

R=lower alkyl or aralkyl
R'=H or acyl

These new compounds contain one more sulphur than vitamin B₁, and the physiological effect of the compound (R=CH₃, R'=H) is nearly the same as, and that of the compound ($R=C_2H_5$, $R'=H$) is a little stronger than, that of vitamin $B_1$.

In accordance with the disclosure in the aforesaid copending application, the compound of the formula

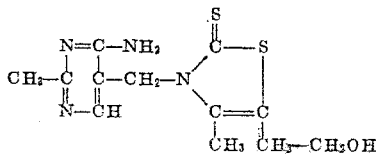

(i. e. $R'=H$, $R=CH_3$), which compound is the N - (2' - methyl - 4' - aminopyrimidyl - 5') - methyl - 4 - methyl - 5 - $\beta$ - hydroxyethylthiothiazolone, is prepared as follows:

(a) A solution of 210 g. of 2-methyl-4-amino-5-aminomethylpyrimidine-hydrochloride in the smallest amount of water is mixed with 160 g. of 50 per cent solution of sodium hydroxide under cooling with water, then 500 cc. of ethanol, 100 cc. of 30% aqueous ammonia and 180 g. of $\gamma$-aceto-$\gamma$-chloropropyl acetate are added to the mixture, and finally 80 g. of carbon disulphide are dropped in with stirring while cooling with water, whereupon the reaction sets in spontaneously with evolution of heat, and the reaction mixture assumes the form of a crystal paste towards the end of the reaction. The crystals are brought into solution by the addition of 500 cc. of 20 per cent hydrochloric acid, and the solution is boiled for 15 minutes. Then, the ethanol is distilled off under reduced pressure, and the residue is treated with a 30 per cent solution of sodium hydroxide with stirring until it is strongly alkaline, when a great quantity of crystals separate out. The product is suction-filtered and washed with water until the washing is no longer alkaline.

The thus-obtained crude N-(2'-methyl-4'-aminopyrimidyl -5')- methyl -4- methyl -5- $\beta$-hydroxyethylthiothiazolone can be purified by recrystallizing from dilute ethanol in the form of colorless needles, which are insoluble in water, soluble in ethanol and methanol, and melt at 238–239°, and form with hydrochloric acid a monohydrochloride melting with decomposition at 243°.

(b) Alternatively, a solution of 210 g. of 2-methyl -4- amino -5- aminomethylpyrimidine-hydrochloride in the smallest amount of water is mixed with a solution of 80 g. of sodium hydroxide in 800 cc. of methanol while cooling with water, then 100 cc. of 30 per cent aqueous ammonia and 140 g. of $\gamma$-aceto-$\gamma$-chloropropyl alcohol (since this compound is obtained as the anhydride is heated on a boiling water bath with two times its weight of water until the insoluble oil disappears—which requires about 30 minutes—and the aqueous solution is used as such) are added, and finally 80 g. of carbon disulphide are dropped in with stirring, and cooling with water, whereupon the reaction starts with evolution of heat. The product is worked up as described under (a) to produce the desired N-(2'-methyl - 4' - amino-pyrimidyl - 5') - methyl-4-methyl-5-$\beta$-hydroxyethylthiothiazolone.

$\gamma$-Aceto-$\gamma$-chloropropyl acetate is prepared in good yield by boiling, under reflux, $\gamma$-aceto-$\gamma$-chloropropyl alcohol (usually in the form of its anhydride) with three times its weight of glacial acetic acid for 5–6 hours, and fractionating the product under reduced pressure.

In accordance with the disclosure in the aforesaid copending application, the compound of the formula

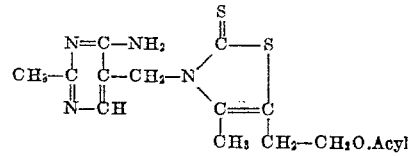

(i. e. $R'=O.COCH_3$, $R=CH_3$), is prepared as follows:

(c) The crystalline reaction mixture described under (a), supra (instead of being dissolved with the aid of hydrochloric acid and worked up as there described) is suction-filtered, and washed first with ethanol, then with water, and recrystallized from dilute ethanol. The product [$\alpha$-aceto -$\gamma$- acetoxypropyl -(2- methyl -4- amino-pyrimidyl-5)-methyl-dithiocarbamate] is soluble in alkali and acid, but insoluble in water, and sinters at about 170° and begins to color towards 210° and melts at 250° with decomposition and blackening. This product also forms with 1 mol of hydrochloric acid a hydrochloride melting with decomposition at 179°. The hydrochloride is heated to 180°, when it melts with bubbling, and after cooling the fused mass is dissolved in water, decolorized with active charcoal, and sodium bicarbonate solution added, whereupon white precipitates separate, which are recrystallized from dilute ethanol in the form of colorless leaflets melting at 172°. This final product is N-(2'-methyl - 4' - amino-pyrimidyl - 5') - methyl - 4-methyl -5 - $\beta$ - acetoxyethylthiothiazolone(2) and its yield is almost theoretical.

In accordance with the disclosure in the aforesaid copending application, the compound of formula

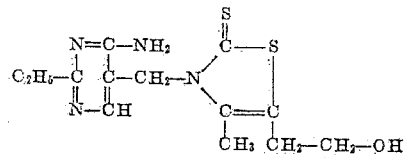

(i. e. $R'=OH$, $R=C_2H_5$), is prepared as follows:

(d) A solution of 225 g. of 2-ethyl-4-amino-5 - aminomethylpyrimidinehydrochloride in the smallest amount of water is mixed with 160 g. of 50 per cent solution of sodium hydroxide under cooling with water, then 500 cc. of ethanol, a concentrated solution of 60 g. of ammonium carbonate in water and 180 g. $\gamma$-aceto-$\gamma$-chloropropyl acetate are added to the mixture, and finally 80 g. of carbon disulphide is dropped in, with stirring, when the reaction sets in with bubbling. When the reaction is complete, the reaction mixture is admixed with 500 cc. of 20 per cent hydrochloric acid and boiled for 15 minutes, and after distilling off the ethanol in vacuo, the residue is admixed with 30 per cent solution of sodium hydroxide until it is strongly alkaline, when a large amount of crystals separate out, which is filtered by suction and washed with water until washing is neutral. The product is recrystallized from dilute ethanol as colorless prisms, which are insoluble in water, soluble in ethanol and methanol, and melt at 233°. The product is the N-(2'-ethyl-4'-aminopyrimidyl-5') - methyl - 4 - methyl - 5 - $\beta$ - hydroxyethylthiothiazolone(2).

The said product may also be prepared as follows:

(e) To a solution of 2.3 parts by weight of potassium hydroxide in a mixture of 8 parts by weight of water and 25 parts by weight of alcohol are added 4.5 parts by weight of 2-ethyl-4-amino - 5 - aminomethylpyrimidinehydrochloride, 3 parts by weight of 10 per cent ammonia, 3.9 parts by weight of γ-aceto-γ-chloropropylalcohol and 2 parts by weight of carbon disulphide successively with stirring, when the reaction sets in with evolving heat. After standing overnight the resultant crystals are filtered and washed with alcohol and water, whereupon 2.5 parts by weight of α-aceto-γ-hydroxypropyl-(2 - ethyl - 4 - aminopyrimidyl - 5) - methyldithiocarbamate are obtained. This product purified by recrystallization from dilute alcohol changes its form at 175° and decomposes completely 220°. It is insoluble in water, soluble in ethanol and methanol, and readily soluble in mineral acids and caustic alkalis.

A half part of the last-named product is dissolved in 5 parts by weight of 10 per cent hydrochloric acid and the solution, after heating for 15 minutes, is made alkaline with sodium hydroxide, when 0.4 part by weight of N-(2'-ethyl - 4' - aminopyrimidyl - (5')) - methyl - 4 - methyl -5-β- hydroxyethylthiothiazolone(2) separates out.

The N -(2'- ethyl - 4' - aminopyrimidyl-5')- methyl - 4 - methyl - 5 - β - acetoxyethylthiothiazolone is prepared analogously as follows:

(f) One part by weight of N-(2'-ethyl-4'-aminopyrimidyl - (5')) - methyl - 4 - methyl-5-β-hydroxyethylthiothiazolone(2) is dissolved in a warm mixture of 10 parts by weight of pyridine and 5 parts by weight of acetic anhydride. The solution is allowed to stand overnight and then evaporated to dryness under reduced pressure. The residue is washed with water and the resultant oil is added with benzene, whereupon it crystallizes. The crude product is recrystallized from dilute alcohol in colorless needles melting at 165°. This product is insoluble in water, soluble in ethanol and methanol, and readily soluble in mineral acids.

The N -(2'- benzyl -4'- aminopyrimidyl-5')- methyl - 4 - methyl - 5 - β - hydroxyethylthiothiazolone is prepared analogously as follows:

(g) To a solution of 12 parts by weight of potassium hydroxide in 300 parts by weight of methanol are added 30 parts by weight of 2-benzyl - 4 - amino - 5 - aminomethylpyrimidine hydrochloride and the resultant potassium chloride is filtered off. To the filtrate are added 20 parts by weight of γ-aceto-γ-chloropropylacetate, a concentrated solution of 5 parts by weight of ammonium carbonate in water and 10 parts of carbon disulphide with stirring, when the reaction starts with evolution of carbon dioxide. When the reaction is complete, the resultant ammonium chloride is filtered off and the filtrate is evaporated to dryness. The residue is dissolved in 200 parts by weight of 15 per cent hydrochloric acid and, after heating for 10 minutes, made alkaline with sodium hydroxide, whereupon crystals separate out. The product is recrystallized from dilute alcohol as colorless crystals melting at 224°. The thus-obtained N-(2'-benzyl-4'-aminopyrimidyl-(5'))-methyl - 4 - methyl - 5 - β - hydroxyethylthiothiazolone(2) is insoluble in water, soluble in ethanol and methanol, and readily soluble in mineral acids.

The last-named product may also be prepared as follows:

(h) To a solution of 1.2 parts by weight of potassium hydroxide in 40 parts by weight of alcohol are added 3 parts by weight of fine powdered 2-benzyl - 4 - amino - 5 - aminomethylpyrimidine hydrochloride. The mixture is heated for a while and the resultant potassium chloride is filtered off. 1 part by weight of 20 percent ammonia, 2 parts by weight of γ-aceto-γ-chloropropylalcohol and finally 2 parts by weight of carbon disulphide are added to the filtrate with stirring. After standing overnight, 30 parts by weight of 10 per cent hydrochloric acid are added to the mixture which is then heated for 30 minutes. When the alcohol is distilled off from the mixture and the residue is made alkaline with sodium hydroxide, an oil separates out, which crystallizes after standing overnight. The product is purified by dissolving in large amount of dilute hydrochloric acid, decolorizing and precipitating with sodium hydroxide.

What we claim is:

1. Thiothiazolone-derivatives of the general formula

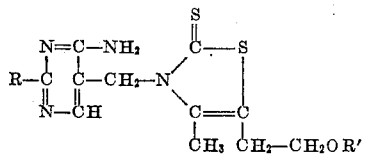

wherein R represents a member selected from the class consisting of lower alkyl and benzyl radicals, R' represents a member selected from the class consisting of hydrogen, acetyl and benzoyl.

2. N - (2' - methyl - 4' - aminopyrimidyl - 5') - methyl - 4 - methyl - 5 - β - hydroxyethylthiothiazolone of the formula

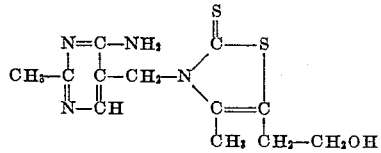

3. N - (2' - methyl - 4' - amino-pyrimidyl-5') - methyl - 4 - methyl - 5 - β - acyloxyethylthiothiazolone of the formula

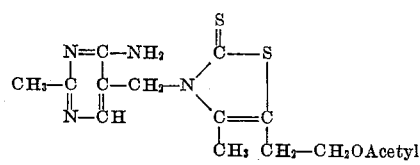

4. N - (2' - ethyl - 4' - aminopyrimidyl - 5') - methyl - 4 - methyl - 5 - β - hydroxyethylthiothiazolone of the formula

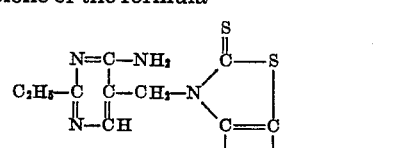

5. N - (2' - benzyl - 4' - amino-pyrimidyl - 5') - methyl - 4 - methyl - 5 - β - hydroxyethylthiothiazolone of the formula

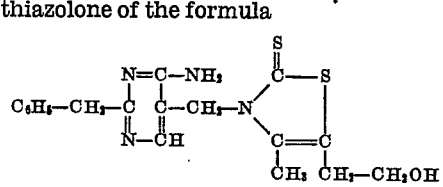

TAIZO MATSUKAWA.
TAKEO IWATSU.

No references cited.